United States Patent Office 3,244,631
Patented Apr. 5, 1966

3,244,631
LUBRICATING COMPOSITION CONTAINING
NON-ASH FORMING ADDITIVES
Henricus G. P. van der Voort, Amsterdam, Netherlands,
assignor to Shell Oil Company, New York, N.Y., a
corporation of Delaware
No Drawing. Filed Oct. 12, 1962, Ser. No. 230,278
Claims priority, application Netherlands, Dec. 29, 1961,
273,042
20 Claims. (Cl. 252—56)

This invention relates to improved liquid hydrocarbons such as mineral oils, and particularly to engine hydrocarbon lubricants having improved detergency, viscosity index wear inhibition, as well as enhanced oxidation and corrosion inhibition properties and to new and improved oil additives therefor.

Until recently, lubricants were commonly doped with various oil-soluble metal salts such as polyvalent metal sulfonates, carboxylates, phenates, phosphates, thiocarbamates, and the like. Some of these substances, such as the sulfonates, phenates and carboxylates possess detergent properties, some such as phenates and thiocarbamates are useful because of their antioxidant properties and some such as the phopshates are useful as anticorrosion additives. In general, these metallic compounds, when subjected to high-temperature and high-pressure conditions, break down and even act as prooxidants, causing deterioration of the oil base resulting in corrosivity, pro-wear, etc.

It is also known that if internal combustion engines are lubricated with a lubricant containing a metallic additive, the ash deposits in the combustion chamber and on the valves may, in part, originate from the residue of the combustion chamber. These ash deposits may lead to difficulties, such as premature ignition of the air-fuel mixture.

To obviate the shortcomings of metallic additives, ashless additives have been recently introduced which are usually linear polymeric compounds containing polar groups such as hydroxyl amino or amide groups and oleophilic groups which are usually long chain alkyl radicals of from 12 to 24 carbon atoms. Polymeric oil additives of this type are available commercially under various trade names such as Du Pont's LOA-564 and 565 additives, which are the subject of U.S. Patent 2,737,496 and are diethylamino alkyl methacrylate polymers or Acryloid 315, 917 or 996 made by Rohm and Haas, as is the subject of Belgain Patent 550,422 and are essentially copolymers of vinyl pyrrolidone and long-chain acrylate esters. These polymers function essentially as detergent and are relatively lacking in anti-wear, pour point depressants and viscosity index improving properties.

It has now been discovered that excellent oil additives can be prepared, which possess good detergent, anti-wear, pour point and viscosity index properties as well as corrosion-inhibiting properties, by forming oil-soluble interlinked oxygen-containing polymers comprised of three polymerizable monomeric units A, B and C, the latter being the interlinking unit in which the ratio of the number of C units to the total number of A and B units is at least 1:2000 respectively. The intrinsic viscosity of these interlinked polymers ranging from about 0.15 to about 1.10 dl./g., preferably between 0.3 and 0.8 dl./g.

Broadly defined A is an ester of a monohydric alcohol with 4–30 carbon atoms and an unsaturated carboxylic acid, B is a monoester of a polyhydric alcohol and an unsaturated carboxylic acid, and C is a compound with two olefinic double bonds.

The A monomers are esters of monohydric alcohols with 4–30 carbon atoms and unsaturated carboxylic acids, for instance, unsaturated monocarboxylic acids, such as acrylic, methacrylic, crotonic, tiglic and angelic acids, or unsaturated dicarboxylic acids, such as maleic, fumaric, mesaconic, citraconic and itaconic acids and the like. These oleophilic monomers cause the polymer to be soluble in the lubricant. The number of oleophilic groups necessary for the polymer to be soluble in the lubricant is easy to determine experimentally. In general, if esters of alcohols with a relatively large number of carbon atoms are used, a smaller number of oleophilic groups is required for solubility of the copolymer than if esters of alcohols with a relatively small number of carbon atoms are used. Naturally, several components A, for instance, both esters of alcohols with a relatively small number of carbon atoms and esters of alcohols with a relatively large number of carbon atoms, may be present in the polymers.

Monomer A is preferably an ester of methacrylic acid.

Monomers B are monoesters of polyhydric alcohols and unsaturated carboxylic acids, for instance, monoesters of glycols, such as ethylene glycol and the propylene glycols, the trihydric alcohols, such as glycerine, and of polyhydric alcohols, such as erythritol, pentaerythritol, mannitol and the like. The acid radical in these monoesters may be derived from an unsaturated monocarboxylic acid, such as acrylic, methacrylic, crotonic, tiglic or angelic acid and the like, or from an unsaturated dicarboxylic acid, such as maleic, fumaric, mesaconic, citraconic, or itaconic acid and the like.

Preference is given to the monoesters of methacrylic acid; in particular the monoester of methacrylic acid and ethylene glycol is preferred.

Monomers C are compounds having two olefinic double bonds, such as diesters of polyhydric alcohols and unsaturated monocarboxylic acids, diesters of dicarboxylic acids and unsaturated alcohols, dialkenyl ethers and hydrocarbons with two olefinically unsaturated double bonds. Examples of suitable diesters of polyhydric alcohols and unsaturated monocarboxylic acids are the esters of the unsaturated monocarboxylic acids acrylic, methacrylic, crotonic, tiglic and angelic acids and the polyhydric alcohols, ethylene glycol, the propylene glycols, erythritol, pentaerythritol, mannitol and the like. It is also possible to use a mixed diester of a polyhydric alcohol.

Of these diesters, the diesters of a dihydric alcohol are preferred; in particular the diester of ethylene glycol and methacrylic acid is preferred.

Examples of other suitable diesters of dicarboxylic acids and unsaturated alcohols are divinyl oxalate, divinyl adipate, divinyl terephthalate, diallyl succinate, diallyl phthalate, di-1-propenyl glutarate and the like. Preference is given to diesters of a dicarboxylic acid and vinyl alcohol, in particular to the diester of an aliphatic dicarboxylic acid and vinyl alcohol, for instance, divinyl adipate.

Examples of suitable dialkenyl ethers are divinyl ether, diallyl ether, di-1-propenyl ether and the like. Preference is given to divinyl ether.

Examples of suitable hydrocarbons with two olefinic double bonds are butadiene, isoprene, 1,4-pentadiene, the hexadienes, the divinylbenzenes, the diallylbenzenes and the like. Preference is given to p-divinylbenzene.

The ratio of the monomeric components A and B may influence the solubility, the detergent action and the pour-point reducing properties of the polymeric compound. At increasing ratio of the number of monomeric components A to the number of monomeric components B in the polymeric compound, the solubility increases and ultimately the detergent action is reduced. The pour-point reducing properties of the polymeric compound may be favorably influenced by using, for instance, as monomeric component A both esters of alcohols with a relatively large number of carbon atoms and ester of alcohols with a relatively small number of carbon atoms, for instance, by starting for the preparation of the polymeric compound from a mixture of esters of alcohols with 16–18 carbon atoms and ester of alcohols with 8–12 carbon atoms.

In particular, preference is given to polymeric compounds which have as components the monomers stearyl methacrylate, lauryl methacrylate, 2-hydroxyethyl methacrylate and a monomer C. These polymeric compounds are preferably prepared by copolymerization of stearyl methacrylate, lauryl methacrylate, methacrylic acid and a monomer C, and conversion of the acid groups in the copolymer obtained into ester groups derived from ethylene glycol by reaction of the copolymer obtained with ethylene oxide.

The polymeric compounds according to the invention can be prepared with the aid of known reactions. For instance, it is possible to start from the monomers and polymerize them, for instance, in a solvent, such as benzene, toluene or the xylenes, with the aid of an initiator, for instance, dibenzoyl peroxide or azo-bis-isobutyronitrile. It is also possible to start from a polymeric compound with interlinked chains possessing the monomeric components A and C and also carboxyl groups and esterify these carboxyl groups with a polyhydric alcohol, which esterification need not be complete. If the polyhydric alcohol is a dihydric alcohol in which the two OH groups are linked to two carbon atoms neighboring each other, the formation of the ester can also be brought about by reacting the carbonyl group with an alkylene oxide, for instance, ethylene oxide, propylene oxide or butylene oxide, which reaction need not be complete either. Polymeric compounds in which C is a diester of a polyhydric alcohol and an unsaturated monocarboxylic acid can be prepared, for instance, starting from a polymer without interlinked chains which contains the monomeric component A and carboxyl groups and which may also contain the monomeric component B and reacting this polymer with a polymer containing the monomeric components A and B, which leads to the formation of a polymer with interlinked chains according to the invention. It is also possible to prepare such polymeric compounds by means of transesterification reactions.

If, in the polymeric compound, the ratio of the number of C units to the total number of A and B units is higher than 1:5, there is a great probability that on account of special cross-linking the polymer is obtained as a gel, i.e., at this higher ratio of the monomers in the polymer to one another it is no longer possible to obtain a non-gelated polymer under any conditions of preparation. Preference is therefore given to a ratio of at most 1:50. In preparing the polymeric compounds according to the invention from monomers including monomers C, there is, at a high monomer conversion, the risk that at the end of the polymerization a polymer is obtained which forms a gel, so that in that case the monomer conversion must be limited to below this point. At lower ratios of monomer C to monomers A and B in most cases high conversions can be reached without gelation occurring. Therefore, in particular a ratio of the number of C units to the total number of A and B units is preferred which is at most 1:100.

The polymeric compounds according to the invention are suitable as additives to lubricants of various kinds. This includes mineral lubricating oils of varying viscosity as well as synthetic lubricating oils and lubricating oils containing fatty oils. The polymeric products can also be incorporated in lubricating greases and as additives in liquid fuels, such as gasoline, kerosene, gas oil and residual fuels.

The products can be added to the lubricant as such. In an advantageous embodiment of the invention the polymeric compound, after its preparation, is only partly freed from the solvent, for instance by distillation under reduced pressure or by steam distillation; subsequently a small quantity of the lubricant is added and finally the remainder of the solvent is distilled off with steam, preferably under reduced pressure.

The concentrate thus obtained can now be diluted with a lubricant and/or be processed into a lubricating grease.

The quantity of the products according to the invention which is added to lubricants can vary within wide limits. In general, the desired improvement is already attained when the quantity added is between about 0.1% and about 5%, in particular 1–3% by weight of the ready lubricant. In special cases, however, larger quantities than those just mentioned can be added, for instance, in diesel engines in which fouling occurs to a considerable degree.

The following examples illustrate the present invention:

*Example I*

Viscosity improver prepared from the monomers stearyl methacrylate, lauryl methacrylate, 2-hydroxyethyl methacrylate and ethylene glycol dimethacrylate.

Copolymers were prepared from stearyl methacrylate, lauryl methacrylate and 2-hydroxyethyl methacrylate in the molar ratio of 7:3:4, different quantities of ethylene glycol dimethacrylate being applied as the fourth monomer. The copolymerizations were effected with continuous stirring at 80° C. in benzene as solvent and with 0.164% by weight benzoyl peroxide, calculated on the total quantity of monomers, as initiator. The polymerization took place in an apparatus sealed against the ambient air in an atmosphere of nitrogen which contained per million parts by volume 120 parts by volume of oxygen. The monomers 2-hydroxyethyl methacrylate and ethylene glycol dimethacrylate were added as follows: The monomers 2-hydroxyethyl methacrylate and ethylene glycol dimethacrylate were mixed and dissolved in benzene, the benzene solution contained 72.5% by weight benzene. The monomers stearyl methacrylate and lauryl methacrylate were dissolved in benzene, the benzene solution contained 72.5% by weight benzene. To this solution part of the solution containing 2-hydroxyethyl methacrylate and ethylene glycol dimethacrylate was added; in the resulting mixture the molar ratio of the monomers stearyl methacrylate, lauryl methacrylate and 2-hydroxyethyl methacrylate to one another was as 7:3:1.77. The remainder of the solution containing 2-hydroxyethyl methacrylate and ethylene glycol dimethacrylate was added to the starting mixture heated to 80° C. in 10 equal portions at intervals of 30, 30, 30, 30, 30, 60, 60, 60, and 60 minutes, respectively, calculated from the moment of adding the intiator to the starting mixture heated to 80° C. The total time of polymerization was 24 hours. To determine the monomer conversion a measured part of the reaction mixture was poured into a ten-fold volume of methanol. The precipitated copolymer was washed with methanol, taken up in benzene, freed from the solvents by freeze-drying, and weighed. The other part of the reaction mixture was mixed with a solvent-refined paraffinic lubricating oil distillate with a viscosity index of 103 and a viscosity of 6.71 cs. at 98.9° C., after which the solvents were removed by distillation in vacuo. Part of the concentrate thus obtained was further diluted with the same lubricating oil until the polymer concentration was 1.5% by weight. Of this solution, the viscosity index was determined.

TABLE I

| Molar ratio of component ethylene glycol dimethacrylate to sum of other components in copolymer | Gelation during copolymerization | Conversion of the monomers, percent | Intrinsic viscosity of copolymer, dl./g. | Viscosity index |
|---|---|---|---|---|
| 1:410 | None | 100 | 0.22 | 129 |
| 1:230 | None | 100 | 0.25 | 130 |
| 1:165 | None | 100 | 0.31 | 134 |
| 1:45 | After 5 hours. | Not determined. | | |

In a subsequent experiment a copolymer was prepared from the same monomers under the same conditions as mentioned above on a semi-technical scale, in which the molar ratio of the monomer ethylene glycol dimethacrylate to the sum of the other monomers was as 1:100. After a polymerization time of ten hours, a tendency to gelation was observed and the polymerization was interrupted by addition of hydroquinone. The monomer conversion, determined as described above, was 82%. The copolymer obtained had an intrinsic viscosity of 0.53; the viscosity index of a 1.5% by weight solution in the solvent-refined paraffinic lubricating oil distillate was 142.

Example II

This example describes the prepartion of a polymeric compound which contains the monomers stearyl methacrylate, lauryl methacrylate, 2-hydroxyethyl methacrylate and ethylene glycol dimethacrylate in the molar ratio of 5:5:3:0.03 from a polymeric compound with the monomers stearyl methacrylate, lauryl methacrylate, methacrylic acid and ethylene glycol dimethacrylate in the ratio of 5:5:3:0.03.

The monomers stearyl methacrylate, lauryl methacrylate, methacrylic acid, and ethylene glycol dimethacrylate were copolymerized with continuous stirring in a flask sealed against the ambient air in an atmosphere of chemically pure nitrogen which, per million of parts by volume, contained 35 parts by volume of oxygen, at a temperature of 70° C. in benzene (containing 10% by weight isopropanol) as solvent. As initiator 0.15% by weight benzoyl peroxide was used, calculated on the total quantity of monomers. The monomers methacrylic acid and ethylene glycol dimethacrylate were added according to the following program: A solution in benzene (containing 10% by weight isopropanol) was prepared which contained the total quantity of monomers stearyl methacrylate and lauryl methacrylate; the content of solvents was 70% by weight. The monomers methacrylic acid and ethylene glycol dimethacrylate were also dissolved in benzene containing 10% by weight isopropanol; the content of solvents was 70% by weight. Of this solution part was added to the first-mentioned solution. The molar ratio of the monomers stearyl methacrylate, lauryl methacrylate and methacrylic acid in this mixture was as 5:5:0.844. The remainder of the solution of the monomers methacrylic acid and ethylene glycol dimethacrylate was added to the starting mixture heated to 70° C. in ten equal portions at intervals of 20, 20, 20, 30, 30, 45, 45, 60, 60 and 60 minutes, respectively, calculated from the moment of adding the intiator to the starting mixture heated to 70° C. The total time of polymerization was 24 hours. To determine the monomer conversion a measured part of the reaction mixture was poured into a ten-fold volume of methanol. The precipitated copolymer was washed with methanol, taken up in benzene, freed from the solvents by freeze-drying, and weighed. The conversion was 100%.

The remainder of the reaction mixture was reacted with ethylene oxide at 100° C. in the presence of 0.0500 by weight of triethylamine catalyst, calculated on the solution. Subsequently the reaction mixture, after cooling down was poured into a ten-fold volume of methanol. The precipitated copolymer was washed with methanol, taken up in benzene, freed from the solvents by freeze-drying. The conversion with ethylene oxide was complete, as appeared from the acid value, which had dropped to zero.

The product obtained was dissolved in the lubricating oil mentioned to a concentration of 1.5% by weight.

For comparison, under the same conditions a copolymer was prepared from stearyl methacrylate, lauryl methacrylate, methacrylic acid and ethylene oxide, without the presence of ethylene glycol dimethacrylate as the fourth monomer. This product, which contained the monomeric units stearyl methacrylate, lauryl methacrylate, and 2-hydroxyethyl methacrylate in the molar ratio of 5:5:3, was also dissolved to a concentration of 1.5% by weight in the same lubricating oil. The viscosity indices of these lubricating oil solutions and the intrinsic viscosities of the copolymers at 98.9° C. in the solvent-refined paraffinic lubricating oil distillate are given in Table II.

TABLE II

| Copolymer | Intrinsic Viscosity, dl./g. | Viscosity Index |
|---|---|---|
| Stearyl methacrylate/lauryl methacrylate/2-hydroxyethyl methacrylate/ethylene glycol dimethacrylate | 0.65 | 144 |
| Stearyl methacrylate/lauryl methacrylate/2-hydroxyethyl methacrylate | 0.46 | 138 |

Example III

A copolymer of stearyl methacrylate, lauryl methacrylate and methacrylic acid, which contained these monomers in the ratio of 5:5:3, was reacted with ethylene oxide; the conversion of the carboxyl groups into ester groups was 85%.

Subsequently, under the influence of an esterification catalyst, the free carboxylic acid groups still present were esterified with the hydroxyl groups of the 2-hydroxyethyl groups formed in the reaction between carboxylic acid group and ethylene oxide. Of the copolymer with interlinked chains thus formed, which contained the monomeric components stearyl methacrylate, lauryl methacrylate, methacrylic acid, 2-hydroxyethyl methacrylate and ethylene glycol dimethacrylate, the viscosity index and the intrinsic viscosity at 98.9° C. in the paraffinic oil was determined.

The reactions were carried out as follows:

402.3 parts by weight of copolymer built up from stearyl methacrylate, lauryl methacrylate and methacrylic acid in the molar ratio of 5:5:3 was dissolved in 753.4 parts by weight of benzene containing 10% by weight isopropanol. The acid number of the copolymer was 0.933 milliequivalent per gram. After addition of a solution of 24.7 parts by weight of ethylene oxide and 1.5 parts by weight of triethylamine in 450 parts by weight of a 9:1 benzene/isopropanol mixture the solution was placed in an autoclave and heated at 105–116° C. for three hours while being stirred. After cooling down the reaction mixture was poured into a ten-fold volume of methanol after which the precipitated copolymer was washed with methanol, taken up in benzene and freed from the solvents by freeze-drying. The yield was 416 parts by weight of copolymer with an acid value of 0.134 milliequivalent per gram.

53.9 parts by weight of the copolymer obtained with an acid value of 0.134 milliequivalent per gram was dissolved in 514.8 parts by weight of a solvent-refined lubricating oil distillate with a viscosity of 4.5 cs. at 98.9° C. and 119.5 parts by weight of xylene. To the solution obtained was added 1 part by weight of beta-naphthalenesulfonic acid, after which the mixture was heated to boiling point. The boiling point of the solution was 175° C. The reaction was refluxed for about 16 hours, and the water formed was removed azeotropically, the xylene layer was removed by distillation. The residue contained 9.5% by weight copolymer.

The viscosity indices of the solutions in oil and the intrinsic viscosities of the polymeric compounds are given in Table III.

TABLE III

| Copolymer | Intrinsic Viscosity, dl./g. | Viscosity Index of 1.5% by weight in oil |
|---|---|---|
| Stearyl methacrylate/lauryl methacrylate/ 2-hydroxyethyl methacrylate/ methacrylic acid/ethylene/glycol dimethacrylate | 0.95 | 145 |
| Stearyl methacrylate/lauryl methacrylate/ 2-hydroxyethyl methacrylate/ methacrylic acid | 0.37 | 134 |

*Example IV*

A copolymer of stearyl methacrylate, lauryl methacrylate, and 2-hydroxyethyl methacrylate which contained those monomers in the molar ratio of 5:5:3 and had an intrinsic viscosity, determined in the paraffinic oil of Example I at 98.9° C., of 0.51 was reacted with a copolymer of stearyl methacrylate and methacrylic acid with a mole weight of 73,000 which contained these monomers in the ratio of 3.4:1 by esterifying these copolymers at 160° C. in a solvent under the influence of a catalyst. Esterification takes place between the carboxylic acid group originating from methacrylic acid and the OH group originating from 2-hydroxyethyl methacrylate.

49.4 parts by weight of stearyl methacrylate/lauryl methacrylate/2-hydroxyethyl methacrylate copolymer and 10.13 parts by weight of stearyl methacrylate/methacrylic acid copolymer were dissolved in 449 parts by weight of xylene, after which to the solution obtained was added 264 parts by weight of a solvent-refining lubricating oil distillate with a viscosity of 4.5 cs. at 98.9° C. After addition of 0.5 parts by weight of beta-naphthalene-sulfonic acid, the mixture was heated and 286 parts by weight of xylene was distilled off, owing to which the temperature of the mixture rose to 160° C. Subsequently the mixture was heated to boiling point for another 18 hours while being stirred with recirculation of xylene. 147.35 parts by weight of the reaction mixture was diluted with 150.1 parts by weight of the solvent-refined lubricating oil distillate already mentioned, after which the xylene still present was distilled off in vacuo at a bath temperature of 100° C. The yield was 248.6 parts by weight of residue containing 18.03 parts by weight of reaction product consisting of a copolymer containing the monomer units stearyl methacrylate, lauryl methacrylate, 2-hydroxyethyl methacrylate, methacrylic acid and ethylene glycol dimethacrylate. The intrinsic viscosity of this product, determined at 98.9° C. in the paraffinic lubricating oil, was 0.89. The viscosity index of 1.5% by weight solutions of the stearyl methacrylate/lauryl methacrylate/2-hydroxyethyl methacrylate copolymer and of the copolymer with interlinked chains prepared from it was 141 and 148, respectively; the viscosity index of a solution of 1.5% by weight in oil of a mixture of stearyl methacrylate/lauryl methacrylate/2-hydroxyethyl methacrylate and stearyl methacrylate/methacrylic acid in the ratio of 49.4:10.13 was 140.

*Example V*

Preparation of a copolymer with interlinked chains containing the monomers stearyl methacrylate, lauryl methacrylate, 2-hydroxyethyl methacrylate and divinyl adipate.

563 parts by weight of stearyl methacrylate, 423 parts by weight of lauryl methacrylate and 86 parts by weight of methacrylic acid were dissolved in a mixture of 2250 parts by weight of benzene and 250 parts by weight of isopropyl alcohol. The solution obtained was heated to 70° C. in an atmosphere of nitrogen which contained, per million parts by volume, 35 parts by volume of oxygen, after which a solution of 1.607 parts by weight of benzoyl peroxide in 20 parts by weight of benzene was added. Subsequently, polymerization was effected for 24 hours at 70° C. with continuous stirring, the above-mentioned atmosphere of nitrogen being maintained.

In the same way a copolymer was prepared from a mixture of 563 parts by weight of stearyl methacrylate, 423 parts by weight of lauryl methacrylate, 86 parts by weight of methacrylic acid and 3.95 parts by weight of divinyl adipate, dissolved in 2250 parts by weight of benzene and 250 parts by weight of isopropyl alcohol.

In both preparations the reaction mixture was poured into a ten-fold volume of methanol, after which the precipitated copolymer was taken up in benzene and freed from the solvents by freeze-drying. The monomer conversion was 91 and 92.5%, respectively; the acid value of both copolymers was 1.0 milliequivalent per gram.

The two copolymers stearyl methacrylate/lauryl methacrylate/methacrylic acid and stearyl methacrylate/lauryl methacrylate/methacrylic acid/divinyl adipate were converted into the copolymers stearyl methacrylate/lauryl methacrylate/2-hydroxyethyl methacrylate and stearyl methacrylate/lauryl methacrylate/2-hydroxyethyl methacrylate/divinyl adipate by reaction with a 200% excess of ethylene oxide. This reaction was carried out in benzene containing 10% by weight isopropyl alcohol as solvent at a copolymer concentration of 30% by weight. The reaction time was 16 hours in the presence of 0.95% by weight triethylamine, calculated on the solution, as catalyst. The reaction products were worked up by pouring the reaction mixture into a ten-fold volume of methanol, taking up the precipitated product in benzene and freeze-drying. The yield was 99% in both cases.

The properties of the copolymers obtained are given in Table IV.

TABLE IV

| Copolymer | Molar ratio of divinyl adipate to the other monomers | Intrinsic Viscosity, dl./g. | Viscosity Index |
|---|---|---|---|
| Stearyl methacrylate/ lauryl methacrylate/2-hydroxyethyl methacrylate | 0 | 0.34 | 135 |
| Stearyl methacrylate/ lauryl methacrylate/2-hydroxyethyl methacrylate/divinyl adipate | 1:217 | 0.40 | 137 |

*Example VI*

Preparation of a copolymer with interlinked chains containing the monomers stearyl methacrylate, lauryl methacrylate, 2-hydroxyethyl methacrylate and p-divinylbenzene.

563 parts by weight of stearyl methacrylate, 423 parts by weight of lauryl methacrylate, and 86 parts by weight of methacrylic acid were dissolved in a mixture of 2250 parts by weight benzene and 250 parts by weight of isopropyl alcohol. The solution obtained was heated to 70° C. in an atmosphere of nitrogen which contained, per million parts by volume, 35 parts by volume of oxygen, after which a solution of 1.607 parts by weight of benzoyl peroxide in 20 parts by weight of benzene was added. Subsequently, polymerization was effected at 70° C. for 7.5 hours with continuous stirring, the above-mentioned atmosphere of nitrogen being maintained.

In the same way a copolymer was prepared from a mixture of 563 parts by weight of stearyl methacrylate, 423 parts by weight of lauryl methacrylate, 86 parts by weight of methacrylic acid and 0.26 part by weight of p-divinylbenzene, dissolved in 2250 parts by weight of benzene and 250 parts by weight of isopropyl alcohol.

In addition, copolymers were prepared, also in the same way, the starting mixture containing, instead of 0.26 part by weight of p-divinylbenzene, 1.30 parts by weight and 4.33 parts by weight of p-divinylbenzene, respectively. In these experiments, the polymerization time was 7 and 2.5 hours, respectively.

In all cases the reaction mixture was poured into a tenfold volume of methanol, after which the precipitated copolymer was taken up in benzene and freed from the solvents by freeze-drying. The monomer conversions amounted to 75, 74, 69 and 27%, respectively, the acid values being 1.05, 1.075, 1.07 and 1.35 milliequivalents per gram, respectively.

The copolymers were converted into the corresponding 2-hydroxyethyl methacrylate copolymers by reaction with a 200% excess of ethylene oxide. This reaction was carried out in benzene containing 10% by weight. The reaction time was 16 hours in the presence of 0.05% by weight triethylamine, calculated on the solution, as catalyst. The reaction products were worked up by pouring the reaction mixture into a ten-fold volume of methanol, taking up the precipitated product into benzene and freeze-drying. The yield was 99% in all cases.

The properties of the copolymers obtained are given in Table V.

TABLE V

| Copolymer | Molar ratio of divinyl adipate to the other monomers | Intrinsic viscosity, dl./g. | Viscosity Index |
|---|---|---|---|
| Stearyl methacrylate/lauryl methacrylate/2-hydroxyethyl methacrylate | 0 | 0.36 | 135 |
| Stearyl methacrylate/lauryl methacrylate/2-hydroxyethyl methacrylate/p-divinyl-benzene | 1:2170 | 0.41 | 137 |
| Stearyl methacrylate/lauryl methacrylate/2-hydroxyethyl methacrylate/p-divinyl-benzene | 1:433 | 0.55 | 142 |
| Stearyl methacrylate/lauryl methacrylate/2-hydroxyethyl methacrylate/p-divinyl-benzene | 1:130 | 0.73 | [1] 144 |

[1] Determined at a concentration of 1.2% by weight copolymer.

Of the copolymers described in the above examples, the intrinsic viscosity was determined in a solvent-refined paraffinic lubricating oil distillate at 98.9° C. The viscosity-improving properties were determined by dissolving the copolymers, to a concentration of 1.5% by weight, in a solvent-refined paraffinic lubricating distillate oil with a viscosity of 6.82 cs. at 98.9° C. and a viscosity index of 105 and determining the viscosity index of the solution obtained according to Dean and Davis (A. Bondi, Physical Chemistry of Lubricating Oils, 1951, pp. 50 and ff.), except in Example I where the viscosity index was determined in a base oil with a viscosity of 6.71 cs. and a viscosity index of 103.

ENGINE TESTS

The detergent properties of the copolymer prepared on a semi-technical scale, described in Example I, with the molar ratio of ethylene glycol dimethacrylate to the other monomers of 1:100 were determined in engine tests carried out in a Gardner diesel engine, a Caterpillar diesel engine and a Petter gasoline engine. In the diesel engine tests the lubricating oil used was a solvent-refined lubricating oil distillate with a viscosity of 11.5 cs. at 98.9° C. and the copolymer concentration was 1.5% by weight.

*Gardner engine.*—Water-cooled 1-cylinder 4-stroke engine. The duration of the test was 17 hours. The fuel was a gas oil with a sulfur content of 0.9% by weight. The cooling water temperature was about 80° C. The power of the engine was 11 H.P., bore 108 mm., stroke 152.4 mm., piston displacement 1.4 liters.

*Caterpillar engine.*—Water-cooled 1-cylinder four-stroke engine. The duration of the test was 38 hours. The fuel was a gas oil with a sulfur content of 0.9% by weight. The cooling water temperature was about 80° C. The power of the engine was 18 H.P., bore 146 mm., stroke 203.2 mm., piston displacement 3.4 liters.

PISTON CLEANLINESS TESTS IN GARDNER AND CATERPILLAR DIESEL ENGINES

[Piston cleanliness ratings (10=clean)]

| | Gardner diesel engine | Caterpillar diesel engine |
|---|---|---|
| Lubricating oil without additive | 3.9 | 4.3 |
| Lubricating oil with additive | 8.3 | 7.0 |

In the Petter gasoline engine the anti-sludge properties were determined at a low temperature of the cooling water. The copolymer concentration was 1.5% by weight, the oil used was a solvent-refined lubricating oil distillate with a viscosity of 6.8 cs. at 98.9° C.

*Petter gasoline engine.*—Water cooled 1-cylinder 4-stroke engine, bore 85 mm., stroke 82.5 mm., piston displacement 468 cm.$^3$. The duration of the test was 28 hours. The fuel was a motor gasoline with 0.32 milliliter tetraethyl lead per liter and a sulfur content of 0.05% by weight. The temperature of the cylinder cooling water was about 55° C. The temperature of the cooling water of the cooled valve cover was about 20° C.

RESULTS

Sludge rating (10=clean)
Lubricating oil without additive _____ 4.4
Lubricating oil with additive _____ 7.5

Other additives may also be incorporated into the compositions of the present invention, for example, anti-scuffing agents; anti-foaming agents, e.g., silicone polymers; viscosity index improvers, for example, anti-scuffing agents; anti-foaming agents, e.g., silicone polymers; viscosity index improvers, for example polymeric acrylic esters, e.g., the acryloids of the 150 or 710 class; extreme pressure additives, for example, dibenzyl disulfide; rust inhibitors, for example, sorbitan monooleate or butyl stearate; oiliness agents, for example, acidless tallow, oleic acid and the like.

I claim as my invention:

1. A liquid hydrocarbon composition comprising a major amount of an oleaginous base and a minor amount sufficient to improve its properties of an oil-soluble interlinked copolymer of (A) an ester of a monohydric alcohol and an unsaturated carboxylic acid having 4–30 carbons atoms, (B) a monoester of a polyhydric alcohol and an unsaturated carboxylic acid and (C) a diolefinic polymerizable interlinking agent selected from the group consisting of diester of ethylene glycol and methacrylic acid, diester of a dicarboxylic acid and vinyl alcohol, dialkenyl ether and divinyl benzene, the ratio of the number of (C) units to the total number of (A) and (B) units in the polymer being at least 1:2000 and the intrinsic viscosity of the copolymer ranging from about 0.15 to about 1.10 dl./g.

2. The composition of claim 1 wherein the liquid hydrocarbon is mineral oil, (A) is an ester of methacrylic acid, (B) is a monoester of methacrylic acid and a polyhydric alcohol, and (C) is a diolefinic polymerizable interlinking agent selected from the group consisting of diester of ethylene glycol and methacrylic acid, diester of a dicarboxylic acid and vinyl alcohol, dialkenyl ether and divinyl benzene, the ratio of the number of (C) units to the total number of (A) and (B) units in the polymer being from about 1:1000 to about 1:100 respectively and the intrinsic viscosity of the copolymer ranging from about 0.15 to about 1.10 dl./g.

3. A mineral lubricating oil composition comprising a major amount of mineral lubricating oil and from about 0.1% to about 5% of an oil-soluble copolymer of (A) $C_{12-18}$ alkyl methacrylate, (B) ω-hydroxy $C_{1-4}$ alkyl methacrylate and (C) diester of ethylene glycol and methacrylic acid, the ratio of (C) to (A) and (B) being from about 1:1000 to about 1:100 respectively and the intrinsic viscosity of the copolymer ranging from about 0.3 to about 0.8 dl./g.

4. A mineral lubricating oil composition comprising a major amount of mineral lubricating oil and from about 0.1% to about 5% of an oil-soluble copolymer of (A) $C_{12-18}$ alkyl methacrylate, (B) ω-hydroxy $C_{1-4}$ alkyl methacrylate, and (C) divinyl adipate, the ratio of (C) to (A) and (B) being from about 1:1000 to about 1:100 respectively and the intrinsic viscosity of the copolymer ranging from about 0.3 to about 0.8 dl./g.

5. A mineral lubricating oil composition comprising a major amount of mineral lubricating oil and from about 0.1% to about 5% of an oil-soluble copolymer of (A) $C_{12-18}$ alkyl methacrylate, (B) ω-hydroxy $C_{1-4}$ alkyl methacrylate, and (C) divinyl benzene, the ratio of (C) to (A) and (B) being from about 1:1000 to about 1:100 respectively and the intrinsic viscosity of the copolymer ranging from about 0.3 to about 0.8 dl./g.

6. A mineral lubricating oil composition comprising a major amount of mineral lubricating oil and from about 0.1% to about 5% of an oil-soluble copolymer of (A) $C_{12-18}$ alkyl methacrylate, (B) methacrylic acid-ethylene oxide reaction product, and (C) diester of ethylene glycol and methacrylic acid, the ratio of (C) to (A) and (B) being from about 1:1000 to about 1:100 respectively and the intrinsic viscosity of the copolymer ranging from about 0.3 to about 0.8 dl./g.

7. A mineral lubricating oil composition comprising a major amount of mineral lubricating oil and from about 0.1% to about 5% of an oil-soluble copolymer of (A) a mixture of lauryl and stearyl methacrylates, (B) 2-hydroxyethyl methacrylate, and (C) diester of ethylene glycol and methacrylic acid, the ratio of (C) to (A) and (B) being from about 1:1000 to about 1:100 respectively and the intrinsic viscosity of the copolymer ranging from about 0.3 to about 0.8 dl./g.

8. A mineral lubricating oil composition comprising a major amount of mineral lubricating oil and from about 0.1% to about 5% of an oil-soluble copolymer of (A) a mixture of lauryl and stearyl methacrylates, (B) 2-hydroxyethyl methacrylate, and (C) divinyl adipate, the ratio of (C) to (A) and (B) being from about 1:1000 to about 1:100 respectively and the intrinsic viscosity of the copolymer ranging from about 0.3 to about 0.8 dl./g.

9. A mineral lubricating oil composition comprising a major amount of mineral lubricating oil and from about 0.1% to about 5% of an oil-soluble copolymer of (A) a mixture of lauryl and stearyl methacrylates, (B) 2-hydroxyethyl methacrylate, and (C) divinyl benzene, the ratio of (C) to (A) and (B) being from about 1:1000 to about 1:100 respectively and the intrinsic viscosity of the copolymer ranging from about 0.3 to about 0.8 dl./g.

10. A mineral lubricating oil composition comprising a major amount of mineral lubricating oil and from about 0.1% to about 5% of an oil-soluble copolymer of (A) a mixture of lauryl and stearyl methacrylates (B) methacrylic acid-ethylene oxide reaction product, and (C) diester of ethylene glycol and methacrylic acid, the ratio of (C) to (A) and (B) being from about 1:1000 to about 1:100 respectively and the intrinsic viscosity of the copolymer ranging from about 0.3 to about 0.8 dl./g.

11. As a new copolymer an oil-soluble interlinked copolymer of (A) an ester of a monohydric alcohol and an unsaturated carboxylic acid having 4–30 carbon atoms, (B) a monoester of a polyhydric alcohol and an unsaturated carboxylic acid, and (C) a diolefinic polymerizable interlinking agent selected from the group consisting of diester of ethylene glycol and methacrylic acid, diester of a dicarboxylic acid and vinyl alcohol, dialkenyl ether and divinyl benzene, the ratio of the number of (C) units to the total number of (A) and (B) units in the polymer being at least 1:2000 and the intrinsic viscosity of the copolymer ranging from about 0.15 to about 1.10 dl./g., said copolymer being useful as an oil-additive.

12. The copolymer of claim 11 wherein (A) is an ester of methacrylic acid, (B) is a monoester of methacrylic acid and a polyhydric alcohol and (C) is a diolefinic polymerizable interlinking agent selected from the group consisting of diester of ethylene glycol and methacrylic acid, diester of a dicarboxylic acid and vinyl alcohol, dialkenyl ether and divinyl benzene, the ratio of the number of (C) units to the total number of (A) and (B) units in the polymer being from about 1:1000 to about 1:100 respectively and the intrinsic viscosity of the copolymer ranging from about 0.15 to about 1.10 dl./g., said copolymer being useful as an oil-additive.

13. As a new copolymer an oil-soluble interlinked copolymer (A) $C_{12-18}$ alkyl methacrylate, (B) ω-hydroxy $C_{1-4}$ alkyl methacrylate and (C) diester of ethylene glycol and methacrylic acid, the ratio of (C) to (A) and (B) being from about 1:1000 to about 1:100 respectively and the intrinsic viscosity of the copolymer ranging from about 0.3 to about 0.8 dl./g. said copolymer being useful as an oil-additive.

14. As a new copolymer an oil-soluble interlinked copolymer of (A) $C_{12-18}$ alkyl methacrylate, (B) ω-hydroxy $C_{1-4}$ alkyl methacrylate and (C) divinyl adipate, the ratio of (C) to (A) and (B) being from about 1:1000 to about 1:100 respectively and the intrinsic viscosity of the copolymer ranging from about 0.3 to about 0.8 said copolymer being useful as an oil-additive.

15. As a new copolymer an oil-soluble interlinked copolymer of (A) $C_{12-18}$ alkyl methacrylate, (B) ω-hydroxy $C_{1-4}$ alkyl methacrylate and (C) divinyl benzene, the ratio of (C) to (A) and (B) being from about 1:1000 to about 1:100 respectively and the intrinsic viscosity of the copolymer ranging from about 0.3 to about 0.8 dl./g. said copolymer being useful as an oil-additive.

16. As a new copolymer an oil soluble interlinked copolymer of (A) $C_{12-18}$ alkyl methacrylate, (B) methacrylic acid-ethylene oxide reaction product and (C) diester of ethylene glycol and methacrylic acid, the ratio of (C) to (A) and (B) being from about 1:1000 to about 1:100 respectively and the intrinsic viscosity of the copolymer ranging from about 0.3 to about 0.8 dl./g. said copolymer being useful as an oil-additive.

17. As a new copolymer an oil-soluble interlinked copolymer of (A) a mixture of lauryl and stearyl methacrylates, (B) ω-hydroxy $C_{1-4}$ alkyl methacrylate and (C) diester of ethylene glycol and methacrylic acid, the ratio of (C) to (A) and (B) being from about 1:1000 to about 1:100 respectively and the intrinsic viscosity of the copolymer ranging from about 0.3 to about 0.8 said copolymer being useful as an oil-additive.

18. As a new copolymer an oil-soluble interlinked copolymer of (A) a mixture of lauryl and stearyl methacrylates, (B) ω-hydroxy $C_{1-4}$ alkyl methacrylates and (C) divinyl adipate, the ratio of (C) to (A) and (B) being from about 1:1000 to about 1:100 respectively and the intrinsic viscosity of the copolymer ranging from about 0.3 to about 0.8 dl./g. said copolymer being useful as an oil-additive.

19. As a new copolymer an oil-soluble interlinked copolymer of (A) a mixture of lauryl and stearyl methacrylates, (B) ω-hydroxy $C_{1-4}$ alkyl methacrylate and (C) divinyl benzene, the ratio of (C) to (A) and (B) being from about 1:1000 to about 1:100 respectively and the intrinsic viscosity of the copolymer ranging from about 0.3 to about 0.8 dl./g. said copolymer being useful as an oil-additive.

20. As a new copolymer an oil-soluble interlinked copolymer of (A) a mixture of lauryl and stearyl methacrylates, (B) methacrylic acid-ethylene oxide reaction product and (C) diester of ethylene glycol and methacrylic acid, the ratio of (C) to (A) and (B) being from about 1:1000 to about 1:100 respectively and the intrinsic viscosity of the copolymer ranging from about 0.3 to about 0.8 dl./g. said copolymer being useful as an oil-additive.

References Cited by the Examiner

UNITED STATES PATENTS

| | | | |
|---|---|---|---|
| 2,630,427 | 3/1953 | Hwa | 260—86.7 |
| 2,630,428 | 3/1953 | Hwa | 260—86.7 |
| 2,643,247 | 6/1953 | Fisher et al. | 260—80.7 |
| 2,731,408 | 1/1956 | Clarke | 260—87.7 X |
| 2,901,458 | 8/1959 | Banes et al. | 252—56 X |
| 2,993,032 | 7/1961 | Stuart et al. | 252—56 |
| 3,001,942 | 9/1961 | Mulvany et al. | 252—56 |
| 3,010,906 | 11/1961 | Signouret et al. | 252—56 |

OTHER REFERENCES 1,113,570, September 1961, Farbenfabriken (printed German application).

DANIEL E. WYMAN, *Primary Examiner.*

JOSEPH R. LIBERMAN, *Examiner.*

P. C. BAKER, P. E. KONOPKA, *Assistant Examiners.*